United States Patent
Wang

(10) Patent No.: US 6,861,485 B2
(45) Date of Patent: Mar. 1, 2005

(54) MULTI-CATALYST SYSTEM FOR OLEFIN POLYMERIZATION

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 96 days.

(21) Appl. No.: 10/600,038

(22) Filed: Jun. 20, 2003

(65) Prior Publication Data

US 2004/0259722 A1 Dec. 23, 2004

(51) Int. Cl.[7] .............................. C08F 4/60; C08F 4/64; C08F 4/642
(52) U.S. Cl. .................. 526/119; 526/113; 526/114; 526/161; 526/172; 502/113; 502/117; 502/129; 502/155; 502/167
(58) Field of Search ................................ 526/113, 114, 526/118, 119, 161, 172; 502/117, 113, 129, 155, 167

(56) References Cited

U.S. PATENT DOCUMENTS

| | | | |
|---|---|---|---|
| 5,371,053 A | 12/1994 | Agapiou et al. | 502/56 |
| 5,442,019 A | 8/1995 | Agapiou et al. | 526/82 |
| 5,747,594 A | 5/1998 | deGroot et al. | 525/240 |
| 6,127,484 A | 10/2000 | Cribbs et al. | 525/191 |
| 6,211,311 B1 | 4/2001 | Wang et al. | 526/131 |
| 6,372,864 B1 | 4/2002 | Brown | 526/65 |
| 6,414,162 B1 * | 7/2002 | Nagy | 548/406 |
| 6,559,251 B1 * | 5/2003 | Wang et al. | 526/127 |

* cited by examiner

Primary Examiner—Roberto Rabago
(74) Attorney, Agent, or Firm—Shao-Hua Guo

(57) ABSTRACT

A multi-catalyst system is disclosed. The catalyst system comprises catalyst A and catalyst B. Catalyst A comprises a supported bridged indenoindolyl transition metal complex. Catalyst B comprises a supported non-bridged indenoindolyl transition metal complex. The catalyst system of the invention produces polyolefins which have bi- or multi-modal molecular weight distribution.

19 Claims, No Drawings

MULTI-CATALYST SYSTEM FOR OLEFIN POLYMERIZATION

FIELD OF THE INVENTION

The invention relates to a multicatalyst system. More particularly, the invention relates to a multi-catalyst system comprising a supported, bridged indenoindolyl metal complex and a supported, non-bridged indenoindolyl metal complex.

BACKGROUND OF THE INVENTION

Single-site polyolefins have narrow molecular weight distribution and uniform composition distribution (i.e., the comonomer recurring units are uniformly distributed along the polymer chains). The combination of narrow molecular weight distribution and uniform composition distribution distinguishes single-site polyolefins from conventional polyolefins made by Ziegler or chromium catalysts. Compared to Ziegler polyolefins, single-site polyolefins have improved impact resistance, tensile strength, and optical properties.

However, the uniformity of molecular weight distribution causes reduced thermal processability of single-site polyolefins. It is difficult to process single-site polyolefins under the conditions normally used for Ziegler polyolefins. The reduced processability limits the development of single-site polyolefins because altering process conditions often requires a large capital investment. Accordingly, it would be highly desirable to prepare polyolefins which possess the improved physical properties offered by single-site catalysts and also exhibit processability characteristics which are similar to those of conventional polyolefins.

One approach to achieve this objective is using mixed catalyst systems. For instance, U.S. Pat. No. 5,747,594 teaches a two-stage polymerization process. In a first stage, ethylene and a higher α-olefin are polymerized with a single-site catalyst. The polymerization continues in a second stage where a Ziegler catalyst is used. Therefore, the product is a mixture of single-site polyolefin and Ziegler polyolefin. The disparity of the two polymers in molecular weight and composition gives the product an improved thermal processability. Also, U.S. Pat. No. 6,127,484 teaches a multiple reaction zone process that uses a single-site catalyst in a first reaction zone and a Ziegler catalyst in a later reaction zone.

Another alternative is using a single-site catalyst in two different polymerization reactors which are operated with different activators. For instance, an alumoxane is used in one reactor and an ionic activator is used in the other. The use of different activators result in polyolefin made in the different reactors having different molecular weights and thus the combined polyolefin has a broad molecular weight distribution and improved processability. See U.S. Pat. No. 6,372,864.

However, the use of mixed catalysts or activators is generally associated with operability problems. The two different catalysts or activators may interfere with one another. For example, the organoaluminum compounds which are often used in Ziegler catalyst poison single-site catalysts. Therefore, catalyst deactivation is often involved when two incompatible catalyst systems are used. Catalyst deactivation is costly and complicated. See U.S. Pat. Nos. 5,371,053 and 5,442,019.

In sum, new catalyst systems are needed. Ideally, the catalyst system would produce polyolefins that have bi- or multi-modal molecular weight distribution. Ideally, the catalyst system would produce bi- or multi-modal polyolefin in a single stage or single reactor process.

SUMMARY OF THE INVENTION

The invention is a multi-catalyst system. The catalyst system comprises catalyst A and catalyst B. Catalyst A comprises bridged indenoindolyl transition metal complex, while catalyst B comprises a non-bridged indenoindolyl transition metal complex. Both catalyst A and catalyst B are supported.

The catalyst system of the invention produces polyolefins having bi- or multi-modal molecular weight distribution without need for the use of a multi-stage or multi-reactor process. Unlike known multi-catalyst systems that contain two incompatible catalysts (such as Ziegler and single-site), the catalyst system of the invention does not cause operational inconvenience because catalyst A and catalyst B are compatible. Further, because both catalysts A and B are single-site catalysts, the produced polyolefins remain the single-site polyolefin characteristic while having improved thermal processability due to the bi- or multi-modal molecular weight distribution.

DETAILED DESCRIPTION OF THE INVENTION

The catalyst system of the invention comprises catalyst A and catalyst B. Catalyst A comprises a bridged indenoindolyl transition metal complex. Preferably, the bridged complex has the general structure I, II, III, or IV:

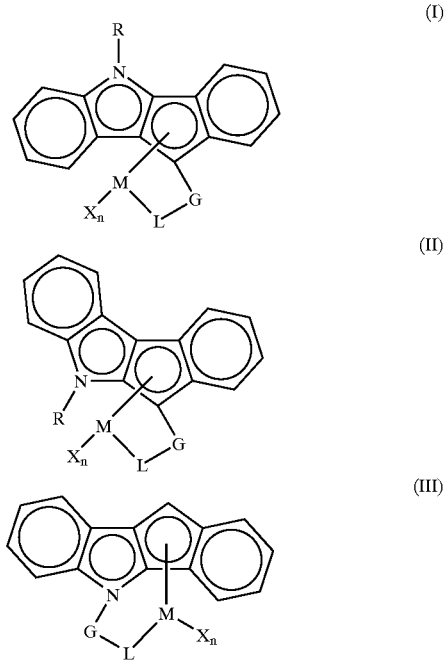

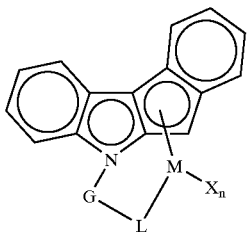

(IV)

M is a transition metal. Preferably, M is Group 4 transition metal. More preferably, M is Zr or Ti.

G is a bridging group, which is preferably selected from the group consisting of dialkylsilyl, diarylsilyl, methylene, ethylene, isopropylidene, and diphenylmethylene, and the like. More preferably, G is selected from the group consisting of dimethylsilyl, methylene, ethylene, and isopropylidene.

L is a ligand that is covalently bonded to G and M. Preferably, L is selected from the group consisting of cyclopentadienyls, indenyls, fluorenyls, boraarys, pyrrolyls, azaborolinyls, quinolinyls, indenoindolyls, phosphinimines, and alkylaminos. More preferably, L is selected from cyclopentadienyls and alkylaminos.

R can be selected from the group consisting of alkyl, aryl, aralkyl, boryl and silyl groups. Preferred R include methyl and dimetylsilyl.

X is a labile ligand, which is preferably selected from the group consisting of alkyl, aryl, alkoxy, aryloxy, halide, dialkylamino, and siloxy groups; n is the number of ligand X which satisfies the valence of M.

Optionally, one or more of the remaining ring atoms of the bridged complex are independently substituted. Suitable substitute groups include alkyl, aryl, aralkyl, alkylaryl, silyl, halogen, alkoxy, aryloxy, siloxy, nitro, dialkyl amino, diaryl amino groups and thioether or the like, mixtures thereof.

The bridged complex is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 2 to about 800 m²/g, preferably about 50 to about 500 m²/g, a pore volume in the range of about 0.1 to about 4.0 mL/g, an average particle size in the range of about 10 to about 500 μm, and an average pore diameter in the range of about 10 to about 1000 Å. They are preferably modified by heat treatment, chemical modification, or both. For heat treatment the support is preferably heated at a temperature from about 50° C. to about 800° C. More preferably, the temperature is from about 100° C. to about 600° C.

Suitable chemical modifiers include organoaluminum, organosilicon, organomagnesium, and organoboron compounds. Organosilicon and organoboron compounds, such as hexamethyl-disilazane and triethylborane, are preferred. Suitable techniques to support a single-site catalyst are known. For instance, U.S. Pat. No. 6,211,311, which is incorporated herein by reference, discusses supporting heteroatomic iigand-containing single-site catalysts. Supported complexes are suitable for gas phase and slurry polymerization.

Optionally, catalyst A further comprises an activator. Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutyl aluminum, lithiumtetrakis (pentafluorophenyl) borate, lithium tetrakis (pentafluorophenyl)aluminate, dimethylanilinium tetrakis (pentafluorophenyl)borate, trityl tetrakis (pentafluorophenyl)borate, tris(pentafluorophenyl)borane, triphenylborane, tri-n-octylborane, the like, and mixtures thereof. Preferred activators include MAO, PMAO, tris-(pentafluorophenyl)borane and trityl tetrakis (pentafluorophenyl)borate.

Activators can be combined with the bridged complex and the mixture is then immobilized on a support. Alternatively, the activator and the complex can be added to the support separately. Activators are generally used in an amount within the range of about 0.01 to about 100,000, preferably from about 0.1 to about 1,000, and most preferably from about 0.5 to about 300, moles per mole of the complex.

Catalyst B comprises a non-bridged indenoindolyl transition metal complex. Preferably, the non-bridged complex has the general structure V or VI:

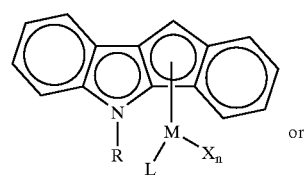

(V)

or

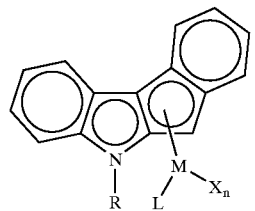

(VI)

Suitable R. M, L, X and n for complexes V and VI are the same as discussed above. Optionally, one or more of the remaining ring atoms of the complex can be substituted. Suitable substitute groups are also discussed above.

The non-bridged complex is immobilized onto a support. Suitable supports are discussed above.

Optionally, catalyst B further comprises an activator. Suitable activators are discussed above.

The ratio of catalyst A/catalyst B is not critical. Preferably, the A/B weight ratio is within the range of 99/1 to 1/99. More preferably, the ratio is within the range of 80/20 to 20/80. Most preferably, the ratio is within the range of 70/30 to 30/70.

The catalyst system is used for α-olefin polymerization. Suitable α-olefins include $C_{2-10}$ α-olefins. Examples are ethylene, propylene, 1-butene, 1-pentene, 1-hexene, 1-octene, 4-methyl-1-pentene, and mixtures thereof. When a single α-olefin is used, a homopolymer is produced. Particularly interesting homopolymers that can be made by the process of the invention include polyethylene and polypropylene. When two or more olefins are used, a copolymer is produced. Particularly interesting copolymers include copolymers of ethylene with 1-butene, 1-pentene, 1-hexene, or 1-octene.

The catalyst system is preferably used in gas phase or slurry polymerization. The polymerization can be conducted batchwise or continuously. In one method, the polymerization is conducted batchwise where an olefin is preferably gradually fed into a reactor in which catalysts A and B are dispersed. In another method, the polymerization is conducted continuously where both olefin and the catalyst system are continuously fed into a reactor, and polymer product is continuously withdrawn from the reactor.

Additional amount of activators can be used in the polymerization. Suitable activators are discussed above. Chain transfer agents such as hydrogen can be used to control the molecular weight of the product. The proportion of hydrogen used can be varied. For example, if less hydrogen is used, a higher molecular weight polymer will be produced. A hydrogen/olefin molar ratio within the range of about 0.001/1 to about 100/1 is preferably used. More preferably, a hydrogen/ethylene molar ratio is within the range of 0.01/1 to 10/1.

The polymerization is preferably conducted under pressure. The pressure is preferably in the range of about 10 to about 15,000 psi, more preferably from about 50 to about 1,000 psi, and most preferably from about 100 to about 500 psi. Generally, the higher the pressure, the more productive the process. Polymerization temperature is preferably within the range from 30° C. to 250° C., more preferably from 60° C. to 100° C.

The invention advantageously produces polyolefins that have bi- or multi-modal molecular weight distribution without using multi-stage or multi-reactor process.

The following examples merely illustrate the invention. Those skilled in the art will recognize many variations that are within the spirit of the invention and scope of the claims.

EXAMPLE 1

Preparation of Catalyst with Bridged Complex VII (a) Preparation of Indeno[1,2-b]indole. A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum to yield product (a) (36.5 g, 72%).

(b) N-Methylation of product (a). A mixture of product (a) (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product (total yield 25.7 g, 66%).

(c) Bridged ligand preparation. n-Butyllithium (8 mL, 2.5 M in hexane, 20 mmol) is added dropwise to a solution of product (b) (4.66 g, 21 mmol) in dry ether (70 mL). After 2 h, this solution is slowly added to a solution of dichlorodimethylsilane (5.20 g) in ether (30 mL). After 2 h of stirring at room temperature, the mixture is filtered and evaporated. The residue is redissolved in ether (60 mL), and an ethereal solution of lithium t-butylamide (prepared in the usual manner from t-butylamine (1.46 g) and n-butyllithium (8 mL of 2.5 M solution)) is added dropwise. The mixture is stirred for 3 h, and is then filtered through Celite filter aid. After concentrating the filtrate, the residue is collected with pentane and chilled to −30° C. Yield of bridged ligand: 6 g (82%).

(d) Preparation of open architecture complex. Bridged ligand (c) (6 g) is dissolved in ether (120 mL) and n-butyllithium (13.5 mL of 2.5 M solution in hexane) is added. After stirring overnight at room temperature, methyllithium (24.5 mL of 1.4 M solution in ether) is added, and the mixture is cooled to −30° C. Titanium tetrachloride bis(tetrahydrofuran) complex (5.66 g) is added, and stirring continues for 3 h. The mixture is filtered and the filtrate is concentrated. The residue is extracted with hot heptane (2×100 mL). The combined filtrates are evaporated, and the residue is crystallized with pentane and cooled to −30° C. The product, complex, is a dark brown solid. Yield: 4.67 g.

The $^1H$ NMR spectrum is consistent with the proposed structure:

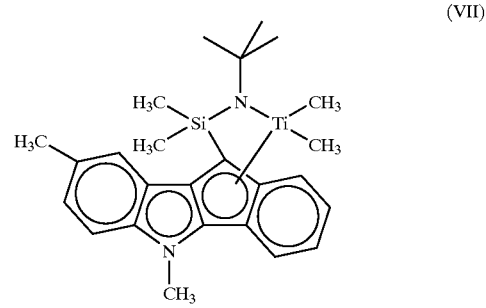

(VII)

(e) Supporting the complex on silica: Silica (Davison G955) is calcined at 600° C. for 12 h. In a glove-box under nitrogen, a 30 wt % solution of methylalumoxane (MAO) in toluene (2.0 mL) is diluted with 4.0 mL additional toluene and then, mixed with 0.037 g of complex VII to form a solution. The solution is added to 1.30 g of the calcined silica at room temperature with efficient stirring. After the addition is complete, stirring continues at room temperature for 1 h. Volatiles are removed under vacuum (about 28.5 inches Hg, 2 hour) at room temperature. Yield: 1.95 g supported catalyst.

EXAMPLE 2

Preparation of Catalyst with Non-Bridged Complex VIII

In a glovebox under nitrogen, N-methylated indeno[1,2-b]indole (14.2 g, 60.9 mmol), prepared as described in Example 1, is dissolved in toluene (175 mL) n-Butyllithium (38.0 mL of 2.5 M solution in hexanes, 95 mmol) is added carefully under vigorous stirring at room temperature to give a red solution. After one hour, a precipitate forms. The mixture is kept at room temperature overnight, and is then filtered and washed with toluene (100 mL) and then heptane (200 mL). The sticky product is dried under nitrogen in the glovebox and is collected and dried under vacuum.

A sample of the indeno[1,2-b]indolyl lithium salt produced above (10 g, 42 mmol) is dissolved in toluene (95 mL) to produce an orange slurry Diethyl ether (35 mL) is added slowly to give an orange solution. This solution is added over 15 min. at room temperature with stirring to a slurry of cyclopentadienylzirconium trichloride (11 g, 42 mmol) in toluene (190 mL) and diethyl ether (190 mL). The mixture turns deep red and is kept at room temperature overnight. The slurry is filtered to recover a red solid, which is washed with toluene (200 mL) and dried under vacuum. Yield of complex VIII: 16.5 g, 78%. The $^1$H NMR spectrum is consistent with the proposed structure.

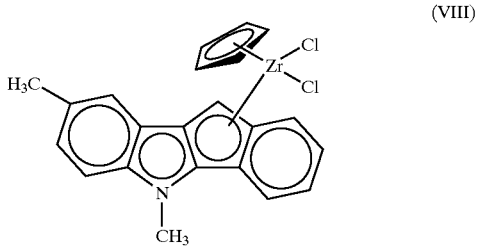

(VIII)

Complex VIII 0.019 g is mixed with MAO and supported on silica according to procedure (e) of Example 1.

EXAMPLE 3

Preparation of a Multi-Catalyst System

A multi-catalyst of example 3 was prepared by blending 0.50g of the supported catalyst prepared in Example 1 and 0.50 g other supported catalyst prepared in Example 2.

COMPARATIVE EXAMPLE 4

Preparation of a Catalyst by Mixing Two Complexes and Then Supporting on Silica

A catalyst with mixed complexes and MAO on silica was prepared according to procedure (e) of Example 1. Instead of a single complex, complex VII 0.037 g and complex VIII 0.019 g is mixed with the diluted MAO and then supported on the silica.

EXAMPLE 5

Ethylene Polymerization with Multi-Catalyst of Example 3

A one-liter, stainless-steel reactor is charged with hydrogen (100 dpsig in total from a 10-mL stainless-steel cylinder pressurized initially to about 650 psig $H_2$) and hexene-1 (15 mL). Triisobutylaluminum (0.5 mL of 1.0 M solution in heptane, 0.5 mmol) and Stadis fatty amine (12 mg, product of Akzo Nobel) in heptane solution (3.0 mL) are mixed in one sidearm of the injector. This mixture is then flushed into the reactor with nitrogen pressure and isobutane (about 400 mL). The reactor is then pressurized with ethylene to 350 psig. The reactor contents are allowed to equilibrate at 80° C. The catalyst of Example 3 (0.058 g) which was pre-loaded into the other injector arm is then flushed into the reactor with isobutane (85 mL) and nitrogen pressure. The polymerization proceeds for 0.5 h. The reactor is vented and the polymer is collected and dried. 66.7 g polymer is obtained.

COMPARATIVE EXAMPLE 6

Ethylene Polymerization with Single-Catalyst of Comparative Example 4

The polymerization procedure of Example 5 is repeated, except changing the catalyst Example 3 to catalyst Example 4. It yields 151.6 g of polymer. The polymer has a single modal molecular weight distribution. The results are summarized in Table 1.

TABLE 1

SUMMARY OF RESULTS

| Example No | Catalyst | Ml | Mn [GPC] | Mw [GPC] | Mw/Mn [GPC] | Modality [GPC] |
|---|---|---|---|---|---|---|
| 5 | Ex. 3 | 0.01 | 32,100 | 510,000 | 15.9 | Bimodal |
| C6 | Ex. C4 | 0.42 | 26,500 | 146,200 | 5.5 | Single Modal |

I claim:
1. A multi-catalyst system that comprises
   (a) catalyst A, a supported bridged indenoindolyl transition metal complex; and
   (b) catalyst B, a supported non-bridged indenoindolyl transition metal complex;
   wherein A and B are separately supported.
2. The catalyst system of claim 1 wherein the complex of catalyst A has the general structure of I, II, III or IV:

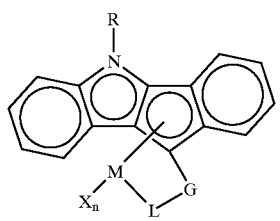

(I)

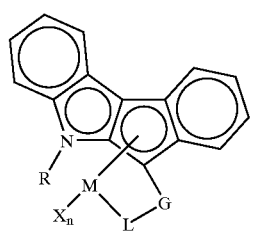

(II)

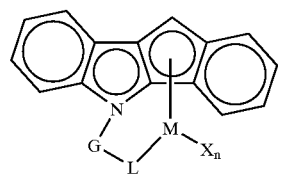

(III)

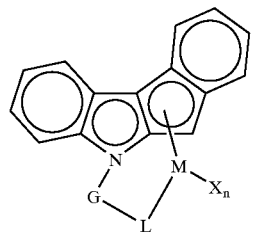

(IV)

in which M is a transition metal; G is a bridge group; L is a ligand that is covalently bonded to G and M; R is selected from the group consisting of alkyl, aryl, aralkyl, boryl and silyl groups; X is selected from the group consisting of alkyl, aryl, alkoxy, aryloxy, halide, dialkylamino, and siloxy groups; n satisfies the valence of M; and one or more of the remaining ring atoms are optionally independently substituted by alkyl, aryl, aralkyl, alkylaryl, silyl, halogen, alkoxy, aryloxy, siloxy, nitro, dialkyl amino, or diaryl amino groups.

3. The catalyst system of claim 2 wherein L is selected from the group consisting of cyclopentadienyls, indenyls, fluorenyls, boraarys, pyrrolyls, azaborolinyls, quinolinyls, indenoindolyls, phosphinimines, and alkylaminos.

4. The catalyst system of claim 2 wherein G is selected from the group consisting of dialkylsilyl, diarylsilyl, methylene, ethylene, isopropylidene, and diphenylmethylene.

5. The catalyst system of claim 2 wherein the bridged complex has the general structure of I or II and wherein M is a Group 4 transition metal, L is alkylamido, and G is dialkylsilyl.

6. The catalyst system of claim 5 wherein M is Ti or Zr, L is t-butylamino, G is dimethylsilyl, and X is halide or alkyl.

7. The catalyst system of claim 2 wherein the bridged complex has the general structure of III or IV and wherein M is a Group 4 transition metal, L is alkylamido, and G is dialkylsilyl.

8. The catalyst system of claim 7 wherein M is Ti or Zr, L is t-butylamino, G is dimethylsilyl, and X is halide or alkyl.

9. The catalyst system of claim 1 wherein the non-bridged complex of catalyst B has the general structure of

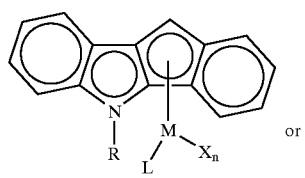

(V)

or

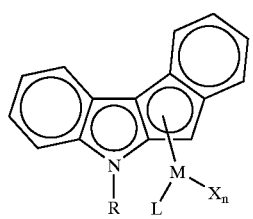

(VI)

in which R is selected from the group consisting of alkyl, aryl, aralkyl, boryl and silyl groups; M is a Group 4-6 transition metal; L is selected from the group consisting of substituted or non-substituted cyclopentadienyls, indenyls, fluorenyls, boraarys, pyrrolyls, azaborolinyls, quinolinyls, indenoindolyls, and phosphinimines; X is selected from the group consisting of alkyl, aryl, alkoxy, aryloxy, halide, dialkylamino, and siloxy groups, and n satisfies the valence of M; and one or more of the remaining ring atoms are optionally substituted by alkyl, aryl, aralkyl, alkylaryl, silyl, halogen, alkoxy, aryloxy, siloxy, nitro, dialkyl amino, or diaryl amino groups.

10. The catalyst system of claim 9 wherein R is methyl, L is cyclopentadienyl; M is Zr; X is chloride, and n is 2.

11. The catalyst system of claim 1 wherein catalyst A further comprises an activator selected from the group consisting of alumoxanes, alkyl aluminums, alkyl aluminum halides, anionic compounds of boron or aluminum, trialkylboron and triarylboron compounds, and mixtures thereof.

12. The catalyst system of claim 11 wherein the activator is an alumoxane.

13. The catalyst system of claim 1 wherein catalyst B further comprises an activator selected from the group consisting of alumoxanes, alkyl aluminums, alkyl aluminum halides, anionic compounds of boron or aluminum, trialkylboron and triarylboron compounds, and mixtures thereof.

14. The catalyst system of claim 13 wherein the activator is an alumoxane.

15. The catalyst system of claim 1 wherein the support in catalyst A and catalyst B is silica.

16. A process comprising polymerizing an α-olefin in the presence of the catalyst system of claim 1.

17. The process of claim 16 which produces a polyolefin having bi- or multi-modal molecular weight distribution.

18. The process of claim 16 wherein the α-olefin is selected from the group consisting of ethylene, propylene, 1-butene, 1-pentene, 1-hexene, 1-octene, 4-methyl-1-pentene, and mixtures thereof.

19. A process comprising polymerizing an α-olefin in the presence of a multi-catalyst system that comprises (a) catalyst A, a supported bridged indenoindolyl transition metal complex; and (b) catalyst B, a supported non-bridged indenoindolyl transition metal complex;

wherein A and B are separately supported, said process produces an polyolefin having bi- or multi-modal molecular weight distribution.

* * * * *